United States Patent
Feng et al.

(10) Patent No.: US 12,019,217 B2
(45) Date of Patent: Jun. 25, 2024

(54) OPTICAL LENSE AND ELECTRONIC DEVICE HAVING THE SAME

(71) Applicant: HON HAI PRECISION INDUSTRY CO., LTD., New Taipei (TW)

(72) Inventors: Ya-Lan Feng, New Taipei (TW); Chun-Cheng Ko, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 668 days.

(21) Appl. No.: 17/202,719

(22) Filed: Mar. 16, 2021

(65) Prior Publication Data

US 2021/0382279 A1    Dec. 9, 2021

(30) Foreign Application Priority Data

Jun. 9, 2020   (CN) .......................... 202010519805.2

(51) Int. Cl.
*G02B 9/64* (2006.01)
*G02B 1/04* (2006.01)
*G02B 13/00* (2006.01)

(52) U.S. Cl.
CPC .......... *G02B 13/0045* (2013.01); *G02B 1/041* (2013.01); *G02B 9/64* (2013.01)

(58) Field of Classification Search
CPC ...... G02B 13/0045; G02B 1/041; G02B 9/64; G02B 13/18; G02B 27/0012; G02B 1/00; G02B 9/62; G02B 9/10

USPC .......................... 359/795, 713, 745, 752, 756
See application file for complete search history.

(56) References Cited

U.S. PATENT DOCUMENTS

| | | | |
|---|---|---|---|
| 8,107,174 B2 * | 1/2012 | Sato ....................... | G02B 13/18 |
| | | | 359/752 |
| 2017/0059828 A1 * | 3/2017 | Sekine ............... | G02B 13/0045 |
| 2021/0356698 A1 * | 11/2021 | Zhang ............... | G02B 13/0045 |

FOREIGN PATENT DOCUMENTS

| | | | | |
|---|---|---|---|---|
| CN | 109270665 A | * | 1/2019 | ......... G02B 13/0045 |
| CN | 110426823 A | * | 11/2019 | ......... G02B 13/0015 |

* cited by examiner

*Primary Examiner* — Marin Pichler
*Assistant Examiner* — Mackenzi Waddell
(74) *Attorney, Agent, or Firm* — ScienBiziP, P.C.

(57) ABSTRACT

An optical lens utilizing individual lenses which are, all but one, made from plastic materials but with an optical clarity unaffected by temperature swings, includes first to sixth lenses. The first to sixth lenses of the optical lens meets conditions of composite formula 4.55<|EFL2|/|EFL1|<4.95, 1.91<(N1−N3)/(N2−N3)<1.93, 0.16<(V1−V3)/(V2−V3)<0.20, 0.95<(N4−N6)/(N5−N6)<1.05 and 0.95<(V4−V6)/(V5−V6)<1.05. EFL1 is a focal length of the first to third lenses, and EFL2 is a focal length of the fourth to sixth lenses. N1, N2, N3, N4, N5, and N6 are respective refractive indexes of the first to sixth lenses, and V1, V2, V3, V4, V5, and V6 are their respective Abbe numbers.

16 Claims, 8 Drawing Sheets

OPTICAL LENSE AND ELECTRONIC DEVICE HAVING THE SAME

FIELD

The subject matter herein generally relates to imaging in electronic devices.

BACKGROUND

Many smart phones have dual or more lenses. The optical lens is generally all-plastic. Because plastic as a material is vulnerable to high temperatures, thus when the plastic lens expands and contracts with heat, images captured by the optical lens may be blurry.

BRIEF DESCRIPTION OF THE DRAWINGS

Implementations of the present disclosure will now be described, by way of embodiments, with reference to the attached figures.

DETAILED DESCRIPTION

Figure 1:
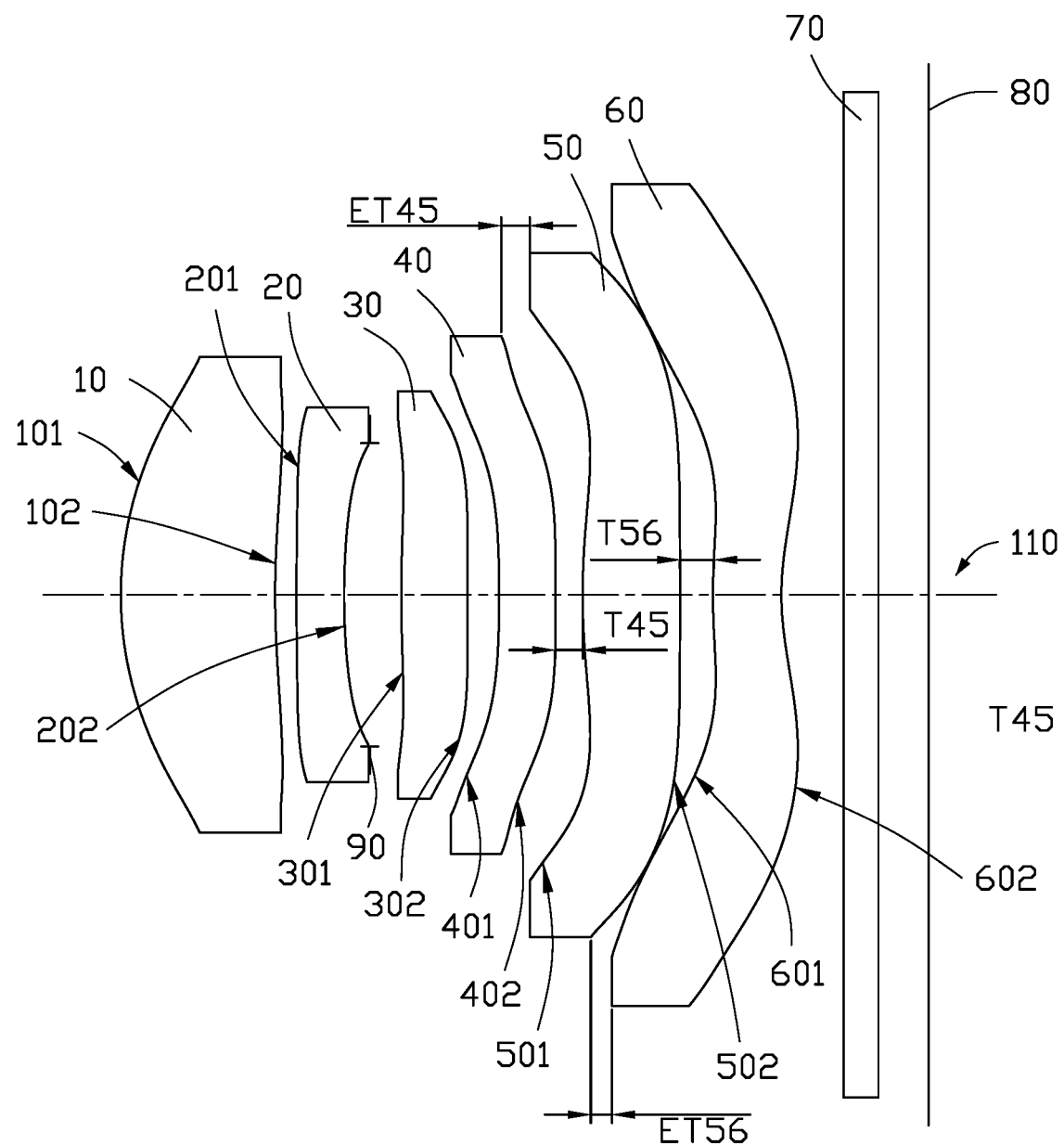
FIG. 1 is a schematic structural diagram of an optical lens according to the present disclosure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "comprising" means "including, but not necessarily limited to"; it specifically indicates open-ended inclusion or membership in a so-described combination, group, series, and the like.

Referring to FIG. 1, the optical lens 100 includes a first lens 10, a second lens 20, a diaphragm 90, a third lens 30, a fourth lens 40, a fifth lens 50, a sixth lens 60, a filter 70, and an image plane 80 arranged in order from the object side to the image side.

The optical lens 100 has an optical axis 110. The first lens 10, the second lens 20, the stop 90, the third lens 30, the fourth lens 40, the fifth lens 50, the sixth lens 60, the filter 70 and the image plane 80 are all arranged symmetrically about the optical axis 110.

The material of the first lens 10 is molded glass, and the material of the second lens 20, the third lens 30, the fourth lens 40, the fifth lens 50, and the sixth lens 60 are all plastic. The molded glass has the advantages of low thermal expansion coefficient resistant to environmental temperature changes, higher refractive index, resistance to abrasion, and easily-coatable surface characteristics. Therefore, the first lens 10 can not only increases the strength of the optical lens 100, but also correct aberrations, so that the optical lens 100 has good imaging quality.

The first lens 10 is an aspheric lens with positive focus. The first lens 10 includes a first surface 101 adjacent to the object side and a second surface 102 adjacent to the image side. The first surface 101 is a convex surface protruding toward the object side, and the second surface 102 is a concave surface in relation to the image side.

The second lens 20 is an aspheric lens with negative focus. The second lens 20 includes a third surface 201 adjacent to the object side and a fourth surface 202 adjacent to the image side. The third surface 201 is a convex surface protruding toward the object side, and the fourth surface 202 is concave in relation to the image side.

The third lens 30 is an aspheric lens with positive focus. The third lens 30 includes a fifth surface 301 adjacent to the object side and a sixth surface 302 adjacent to the image side. The fifth surface 301 is a convex surface protruding toward the object side, and the sixth surface 302 is concave in relation to the image side.

The fourth lens 40 is an aspheric lens with negative focus. The fourth lens 40 includes a seventh surface 401 adjacent to the object side and an eighth surface 402 adjacent to the image side. The seventh surface 401 is concave towards the object side, and the eighth surface 402 is concave towards the image side.

The fifth lens 50 is an aspheric lens with positive focus. The fifth lens 50 includes a ninth surface 501 adjacent to the object side and a tenth surface 502 adjacent to the image side. The ninth surface 501 is a convex surface protruding toward the object side, and the tenth surface 502 is convex towards the image side.

The sixth lens 60 is an aspheric lens with negative focus. The sixth lens 60 includes an eleventh surface 601 adjacent to the object side and a twelfth surface 602 adjacent to the image side. The eleventh surface 601 is a convex surface toward the object side, and the twelfth surface 602 is concave towards the image side.

The filter 70 is used to filter out the infrared light in the light passing through the sixth lens 60 so as to improve quality of images on the image plane 80.

The image plane 80 is used for imaging.

The diaphragm 90 is used to limit a size of the imaging beam or the imaging size range. The diaphragm 90 is close to the fourth surface 202 of the second lens 20.

In the embodiment, the first surface 101, second surface 102, third surface 201, fourth surface 202, fifth surface 301, sixth surface 302, seventh surface 401, eighth surface 402, ninth surface 501, tenth surface 502, eleventh surface 601, and the twelfth surface 602 meet the conditions of following formula (1):

$$Z = \frac{cr^2}{1 + \sqrt{1-(1+K)c^2r^2}} + A_4h^4 + A_6h^6 + A_8h^8 +$$
$$A_{10}h^{10} + A_{12}h^{12} + A_{14}h^{14} + A_{16}h^{16} + A_{18}h^{18} + A_{20}h^{20} + A_{22}h^{22}$$

Wherein, "Z" is the concavity of the aspheric surface; "c" is the reciprocal of the radius of curvature; "r" is the off-axis radius; "K" is the conic coefficient. The "A4, A6, A8, A10, A12, A14, A16, A18, A20, A22" are coefficients of aspheric surface.

In the embodiment, the optical lens 100 meets the conditions of the following composite formula (formula (2)):

4.55<|EFL2|/|EFL1|<4.95;

1.91<(N1−N3)/(N2−N3)<1.93;

0.16<(V1−V3)/(V2−V3)<0.20;

0.95<(N4−N6)/(N5−N6)<1.05;

0.95<(V4−V6)/(V5−V6)<1.05;

Wherein, EFL1 is the focal length of the first lens group, composed of the first lens 10 to the third lens 30, and EFL2 is the focal length of the second lens group composed of the fourth lens 40 to the sixth lens 60. N1 is the refractive index of first lens 10, N2 is the refractive index of the second lens, N3 is the refractive index of the third lens 30, N4 is the refractive index of the fourth lens 40, N5 is the refractive index of the fifth lens 50, and N6 is the refractive index of the sixth lens 60. V1 is the Abbe number of the first lens 10, V2 is the Abbe number of the second lens 20, V3 is the Abbe number of the third lens 30, V4 is the Abbe number of the fourth lens 40, V5 is the Abbe number of the fifth lens 50, and V6 is the Abbe number of the sixth lens 60.

The condition in formula (2) of "4.55<|EFL2|/|EFL1|<4.95" ensures proper power distribution of a lens system, thereby reducing the decentering sensitivity of the lens system.

The condition "1.91<(N1−N3)/(N2−N3)<1.93" and the condition "0.16<(V1−V3)/(V2−V3)<0.20" to correct aberrations, so that the optical lens 100 has good imaging quality.

The condition "0.95<(N4−N6)/(N5−N6)<1.05" and the condition "0.95<(V4−V6)/(V5−V6)<1.05" correct aberrations, so that the optical lens 100 has good imaging quality.

Further, the optical lens 100 also satisfies the condition "1.10<D/TTL<1.30", wherein D is the maximum imaging circle diameter, and TTL is the total length of the optical lens 100. The condition "1.10<D/TTL<1.30" limits the total length of the entire optical lens 100.

Further, the optical lens 100 also satisfies the conditions in the following composite formula (formula (3)): 2.26<SF1<2.31 and 0.45<SF4<0.49; wherein SFi=(C1i+C2i)/(C1i−C2i), i=1, 4, C1i is the surface curvature of the i-th lens on the object side, and C2i is the surface curvature of the i-th lens on the image side. The conditions of formula (3) ("2.26<SF1<2.31" and "0.45<SF4<0.49") are used to correct aberrations, so that the optical lens has good imaging quality.

Further, the optical lens 100 also satisfies the conditions of the following composite formula (formula (4)), "0.95<T45/ET45<1.05" and "1.05<T56/ET56<1.65". Wherein T45 is the thickness of the center interval between the fourth lens 40 and the fifth lens 50, ET45 is the edge interval thickness between the fourth lens 40 and the fifth lens 50, T56 is the center separation thickness between the fifth lens 50 and the sixth lens 60, and ET56 is the edge interval thickness between the fifth lens 50 and the sixth lens 60. The conditions "0.95<T45/ET45<1.05" and "1.05<T56/ET56<1.65" are used to correct aberrations, so that the optical lens has good imaging quality.

The following Tables 1-3 show some parameters of the optical lens 100 in the first embodiment. In Table 1, R represents the radius of curvature of the corresponding surface, and T represents the thickness of the corresponding lens.

By satisfying the above aspheric formulas and conditions of formulas with values in Tables 1-3, the first surface 101, the second surface 102, the third surface 201, the fourth surface 202, and the fifth surface 301, the sixth surface 302, the seventh surface 401, the eighth surface 402, the ninth surface 501, the tenth surface 502, the eleventh surface 601, and the twelfth surface 602 corresponding to the first lens 10 can be achieved. The second lens 20, the third lens 30, the fourth lens 40, the fifth lens 50, and the sixth lens 60 can thus be created. The optical lens 100 can correct the aberrations and has good imaging quality.

TABLE 1

| surface | Types | Radius of curvature (mm) | thickness (mm) | Refractive index | Abbe number |
|---|---|---|---|---|---|
| Object side | flat | gigantic | gigantic | — | — |
| air | flat | gigantic | 0 | — | — |
| First surface | Aspherical | 0.54 | 0.92 | 1.77 | 49.60 |
| Second surface | Aspherical | 0.21 | 0.14 | — | — |
| Third surface | Aspherical | 0.07 | 0.30 | 1.66 | 20.40 |
| fourth surface | Aspherical | 0.26 | 0.18 | — | — |
| diaphragm | flat | gigantic | 0.15 | — | — |
| fifth surface | Aspherical | 0.14 | 0.40 | 1.54 | 56.00 |
| sixth surface | Aspherical | 0.06 | 0.19 | — | — |
| seventh surface | Aspherical | −0.11 | 0.34 | 1.64 | 23.50 |
| eighth surface | Aspherical | 0.04 | 0.16 | — | — |
| ninth surface | Aspherical | 0.27 | 0.58 | 1.64 | 23.50 |
| tenth surface | Aspherical | −0.01 | 0.17 | — | — |
| eleventh surface | Aspherical | 0.37 | 0.41 | 1.53 | 55.70 |
| twelfth surface | Aspherical | 0.68 | 0.38 | — | — |
| filter | flat | gigantic | 0.21 | 1.52 | 54.50 |
| | flat | gigantic | 0.30 | — | — |
| Image side | flat | gigantic | — | — | — |

TABLE 2

| Aspheric coefficient | First surface | Second surface | Third surface | fourth surface | fifth surface | sixth surface |
|---|---|---|---|---|---|---|
| K | −9.0267E−01 | −2.7449E+01 | 0.0000E+00 | −5.3588E+01 | 4.1643E+01 | 0.0000E+00 |
| $A_4$ | 1.4094E−02 | −4.8189E−02 | −8.4905E−02 | 6.3413E−02 | −1.1929E−01 | −1.7510E−01 |
| $A_6$ | −9.0569E−03 | 1.2287E−03 | 8.294E−02 | 4.5162E−01 | 4.0283E−02 | 1.9006E−01 |
| $A_8$ | 1.9192E−02 | 1.5277E−02 | 2.5229E−01 | −2.1288E+00 | −2.7194E−01 | −6.2258E−01 |
| $A_{10}$ | −2.8150E−02 | 1.4698E−02 | −6.2095E−01 | 7.0606E+00 | 8.7553E−01 | 1.0604E+00 |

TABLE 2-continued

| | | | | | | |
|---|---|---|---|---|---|---|
| $A_{12}$ | 2.1278E−02 | −7.2260E−02 | 8.0199E−01 | −1.2980E+01 | −1.6580E+00 | −1.1527E+00 |
| $A_{14}$ | −9.4309E−03 | 6.1870E−02 | −1.1696E+00 | 1.2395E+01 | 1.5424E+00 | 7.0464E−01 |
| $A_{16}$ | 1.6269E−03 | 2.1880E−02 | 1.9939E+00 | −4.7134E+00 | −5.2934E−01 | −1.7114E−01 |
| A18 | — | −7.1585E−02 | −2.2783E+00 | — | — | — |
| A20 | — | 4.6259E−02 | 1.3717E+00 | — | — | — |
| A22 | — | −1.0273E−02 | −3.3317E−01 | — | — | — |

| Aspheric coefficient | seventh surface | eighth surface | ninth surface | tenth surface | eleventh surface | twelfth surface |
|---|---|---|---|---|---|---|
| K | 5.1135E+01 | 0.0000E+00 | −4.2743E+01 | −2.2073E+01 | −9.5594E+00 | −6.7759E+00 |
| A4 | −2.1310E−01 | −3.1444E−01 | 3.4123E−02 | 2.8389E−03 | −4.2062E−01 | −2.3184E−01 |
| A6 | 1.0058E−01 | 2.0783E−01 | −2.4682E−01 | −4.2438E−02 | 2.2129E−01 | 1.3399E−01 |
| A8 | 1.0922E−01 | −1.6728E−01 | 2.7080E−01 | 9.5107E−03 | −4.2891E−02 | −5.7764E−02 |
| A10 | −5.2589E−01 | 1.2967E−01 | −1.8812E−01 | 6.8909E−03 | −3.4093E−03 | 1.8139E−02 |

| Aspheric coefficient | First surface | Second surface | Third surface | fourth surface | fifth surface | sixth surface |
|---|---|---|---|---|---|---|
| A12 | 7.2880E−01 | −3.1499E−02 | 7.9956E−02 | −4.4635E−03 | 2.0910E−03 | −3.6150E−03 |
| A14 | −4.0276E−01 | −5.4429E−03 | −1.7785E−02 | 5.0790E−04 | 1.3026E−04 | 2.9295E−04 |
| A16 | 7.7909E−02 | −5.6904E−04 | 8.8161E−04 | 2.4488E−04 | −7.1320E−05 | 2.2080E−05 |
| A18 | — | 1.7829E−03 | −4.3613E−05 | −7.8989E−05 | −1.4444E−05 | −1.8410E−06 |
| A20 | — | −1.6070E−04 | 2.7730E−04 | 6.3339E−06 | 4.6601E−06 | −8.9477E−07 |
| A22 | — | −5.3659E−05 | −6.4212E−05 | 1.3367E−07 | −2.6085E−07 | 9.3921E−08 |

TABLE 3

| F(mm) | F/# | FOV (2ω) | TTL(mm) | D(mm) | EFL1 | EFL2 |
|---|---|---|---|---|---|---|
| 4.06 | 1.67 | 72.93 | 4.82 | 5.83 | 4.28 | −20.80 |

| SF1 | SF4 | T45 | ET45 | T56 | ET56 |
|---|---|---|---|---|---|
| 2.28 | 0.46 | 0.16 | 0.15 | 0.17 | 0.15 |

The following Tables 4-6 show some parameters of the optical lens 100 in a second embodiment. In Table 4, R represents the radius of curvature of the corresponding surface, and T represents the thickness of the corresponding lens.

By satisfying the above aspheric formulas and conditions in formulas with the values shown in Tables 4-6, the first surface 101, the second surface 102, the third surface 201, the fourth surface 202, and the fifth surface 301, the sixth surface 302, the seventh surface 401, the eighth surface 402, the ninth surface 501, the tenth surface 502, the eleventh surface 601, and the twelfth surface 602 corresponding to the first lens 10 can thus be achieved. The second lens 20, the third lens 30, the fourth lens 40, the fifth lens 50, and the sixth lens 60 can thus be made. The optical lens 100 in the second embodiment can also correct aberrations and has good imaging quality.

TABLE 4

| surface | Types | Radius of curvature (mm) | thickness (mm) | Refractive index | Abbe number |
|---|---|---|---|---|---|
| Object side | flat | gigantic | gigantic | — | — |
| air | flat | gigantic | 0 | — | — |
| First surface | Aspherical | 0.53 | 0.92 | 1.77 | 49.60 |
| Second surface | Aspherical | 0.21 | 0.13 | — | — |
| Third surface | Aspherical | 0.07 | 0.29 | 1.66 | 20.40 |
| fourth surface | Aspherical | 0.25 | 0.15 | — | — |
| diaphragm | flat | gigantic | 0.19 | — | — |
| fifth surface | Aspherical | 0.14 | 0.40 | 1.54 | 56.00 |
| sixth surface | Aspherical | 0.06 | 0.19 | — | — |
| seventh surface | Aspherical | −0.11 | 0.34 | 1.64 | 23.50 |
| eighth surface | Aspherical | 0.04 | 0.16 | — | — |
| ninth surface | Aspherical | 0.28 | 0.58 | 1.64 | 23.50 |
| tenth surface | Aspherical | −0.01 | 0.20 | — | — |
| eleventh surface | Aspherical | 0.34 | 0.41 | 1.53 | 55.70 |
| twelfth surface | Aspherical | 0.68 | 0.37 | — | — |
| filter | flat | gigantic | 0.21 | 1.52 | 54.50 |
| | flat | gigantic | 0.30 | — | — |
| Image side | flat | gigantic | — | — | — |

TABLE 5

| Aspheric coefficient | First surface | Second surface | Third surface | fourth surface | fifth surface | sixth surface |
|---|---|---|---|---|---|---|
| K | −9.0267E−01 | −2.7449E+01 | 0.0000E+00 | −5.3588E+01 | 4.1643E+01 | 0.0000E+00 |
| $A_4$ | 1.4354E−02 | −4.8376E−02 | −8.5622E−02 | 6.1152E−02 | −1.1540E−01 | −1.7519E−01 |
| $A_6$ | −8.8873E−03 | 1.5609E−03 | 8.2388E−02 | 4.5040E−01 | 4.1912E−02 | 1.9280E−01 |
| $A_8$ | 1.9290E−02 | 1.5527E−02 | 2.5220E−01 | −2.1290E+00 | −2.7405E−01 | −6.2593E−01 |
| $A_{10}$ | −2.8102E−02 | 1.4812E−02 | −6.2082E−01 | 7.0584E+00 | 8.7287E−01 | 1.0597E+00 |
| $A_{12}$ | 2.1295E−02 | −7.2229E−02 | 8.0206E−01 | −1.2985E+01 | −1.6592E+00 | −1.1524E+00 |
| $A_{14}$ | −9.4285E−03 | 6.1859E−02 | −1.1696E+00 | 1.2389E+01 | 1.5434E+00 | 7.0509E−01 |
| $A_{16}$ | 1.6245E−03 | 2.1853E−02 | 1.9937E+00 | −4.7068E+00 | −5.2606E−01 | −1.7084E−01 |

TABLE 5-continued

| Aspheric coefficient | | seventh surface | eighth surface | ninth surface | tenth surface | eleventh surface | twelfth surface |
|---|---|---|---|---|---|---|---|
| A18 | | — | −7.1611E−02 | −2.2784E+00 | — | — | — |
| A20 | | — | 4.6248E−02 | 1.3717E+00 | — | — | — |
| A22 | | — | −1.0266E−02 | −3.3298E−01 | — | — | — |
| K  | | 5.1135E+01 | 0.0000E+00 | −4.2743E+01 | −2.2073E+01 | −9.5594E+00 | −6.7759E+00 |
| A4 | | −2.1476E−01 | −3.1361E−01 | 3.8076E−02 | 6.4534E−03 | −4.2067E−01 | −2.3063E−01 |
| A6 | | 1.0158E−01 | 2.0784E−01 | −2.4709E−01 | −4.2115E−02 | 2.2120E−01 | 1.3359E−01 |
| A8 | | 1.0946E−01 | −1.6733E−01 | 2.7065E−01 | 9.4612E−03 | −4.2920E−02 | −5.7808E−02 |
| A10 | | −5.2600E−01 | 1.2963E−01 | −1.8817E−01 | 6.8783E−03 | −3.4142E−03 | 1.8138E−02 |

| Aspheric coefficient | First surface | Second surface | Third surface | fourth surface | fifth surface | sixth surface |
|---|---|---|---|---|---|---|
| A12 | 7.2868E−01 | −3.1521E−02 | 7.9941E−02 | −4.4640E−03 | 2.0904E−03 | −3.6145E−03 |
| A14 | −4.0283E−01 | −5.4542E−03 | −1.7789E−02 | 5.0826E−04 | 1.3027E−04 | 2.9308E−04 |
| A16 | 7.7854E−02 | −5.7272E−04 | 8.8072E−04 | 2.4499E−04 | −7.1290E−05 | 2.2103E−05 |
| A18 | — | 1.7816E−03 | −4.3672E−05 | −7.8975E−05 | −1.4433E−05 | −1.8384E−06 |
| A20 | — | −1.6094E−04 | 2.7738E−04 | 6.3302E−06 | 4.6636E−06 | −8.9470E−07 |
| A22 | — | −5.3654E−05 | −6.4155E−05 | 1.3031E−07 | −2.5995E−07 | 9.3843E−08 |

TABLE 6

| F(mm) | F/# | FOV (2ω) | TTL(mm) | D(mm) | EFL1 | EFL2 |
|---|---|---|---|---|---|---|
| 4.06 | 1.67 | 72.93 | 4.82 | 5.83 | 4.31 | −19.83 |

| SF1 | SF4 | T45 | ET45 | T56 | ET56 |
|---|---|---|---|---|---|
| 2.29 | 0.48 | 0.16 | 0.17 | 0.20 | 0.13 |

Figure 2:
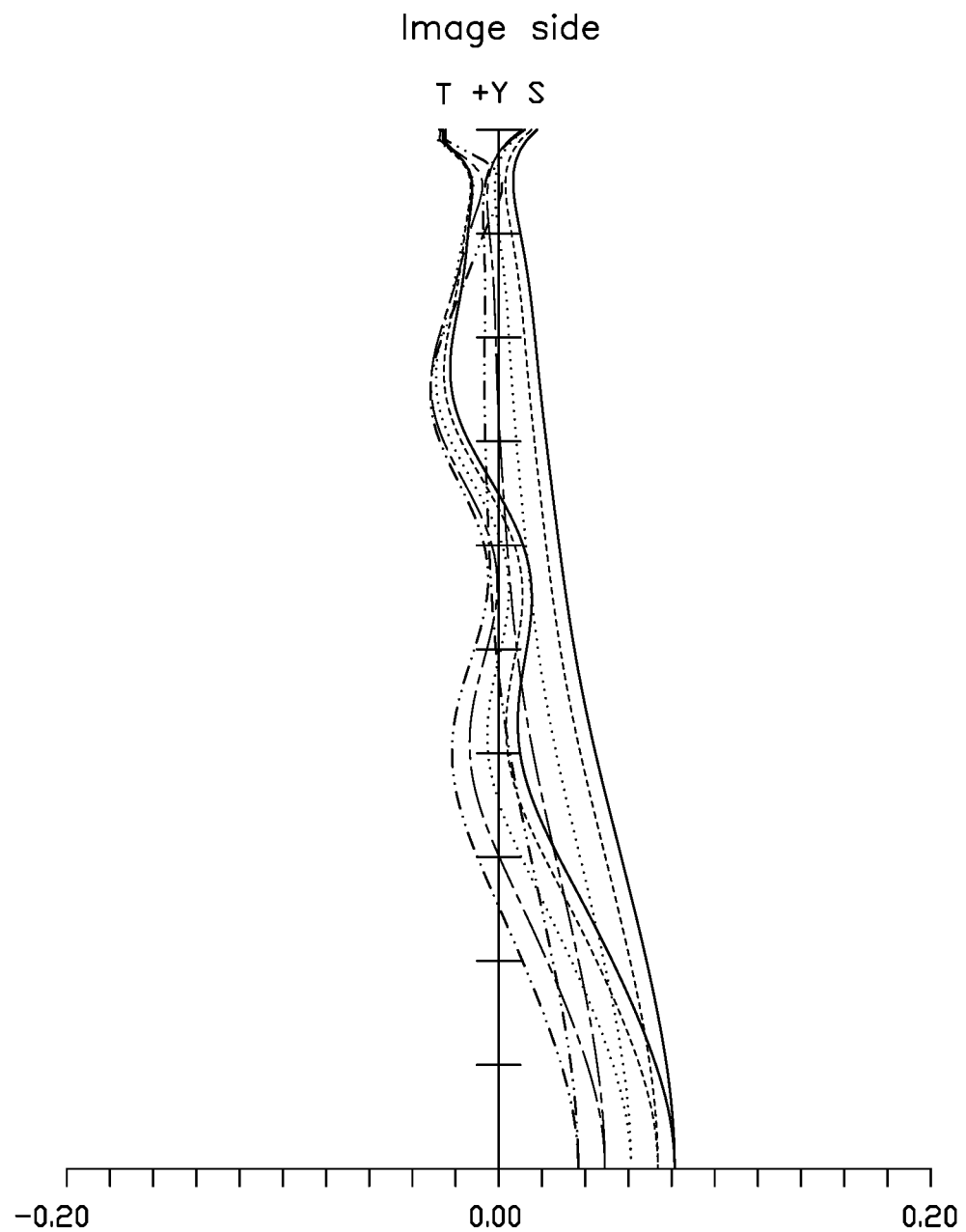
FIG. 2 is a characteristic curve diagram of visible light imaging field curvatures of a first embodiment of the lens in FIG. 1.
Figure 3:
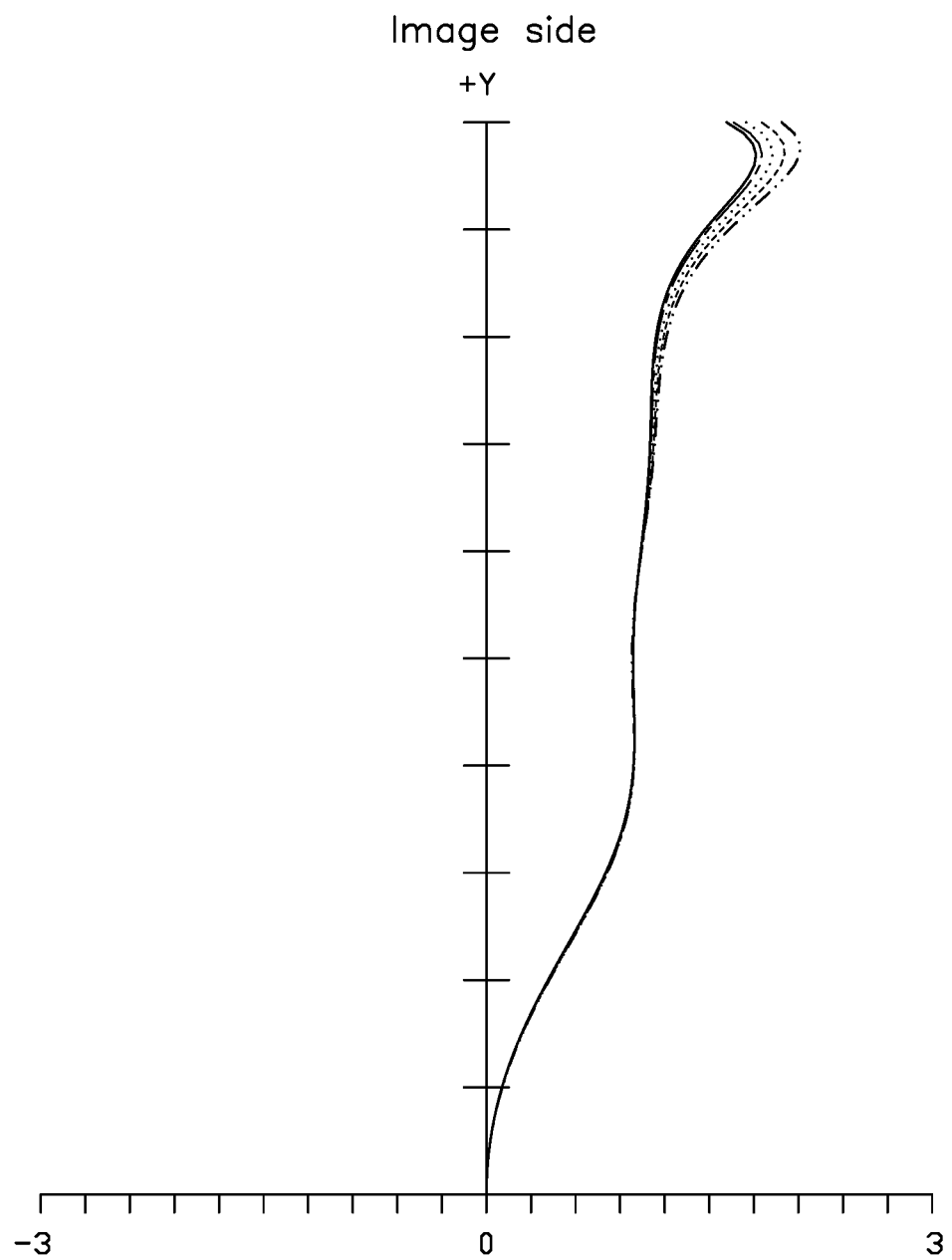
FIG. 3 is a visible light distortion characteristic curvature diagram of a first embodiment of the lens in FIG. 1.
Figure 4:
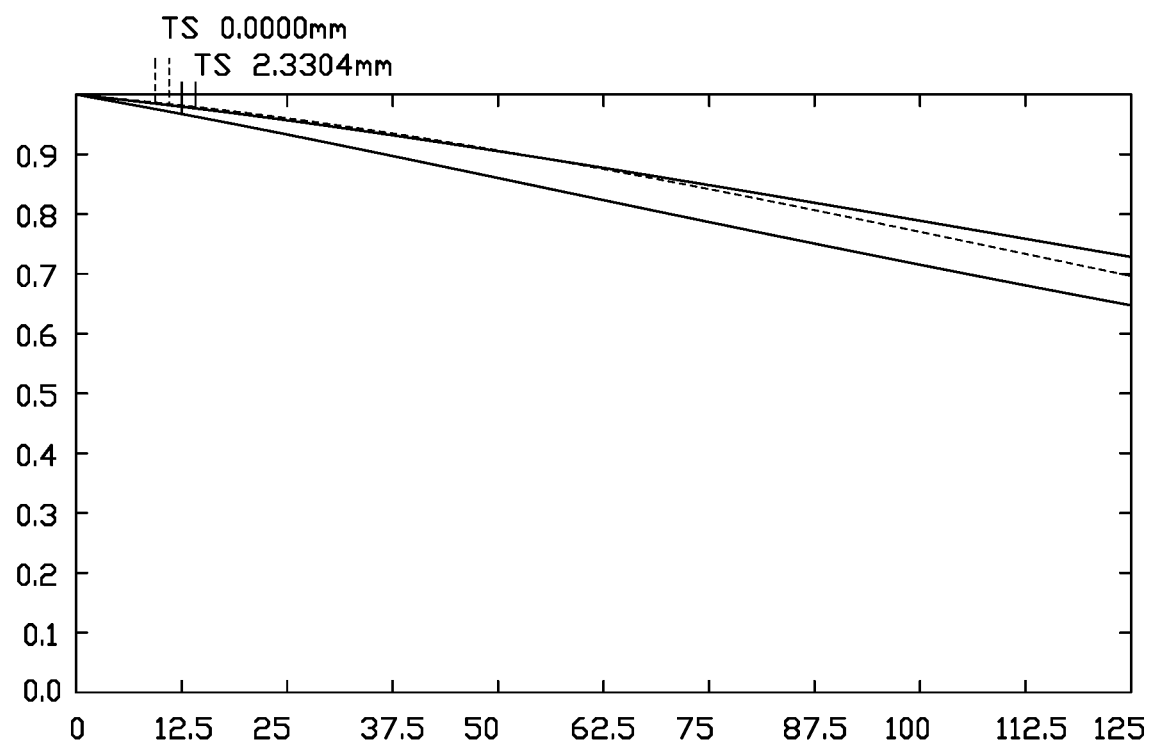
FIG. 4 is an MTF curvature diagram of a first embodiment of the lens in FIG. 1.
Figure 5:
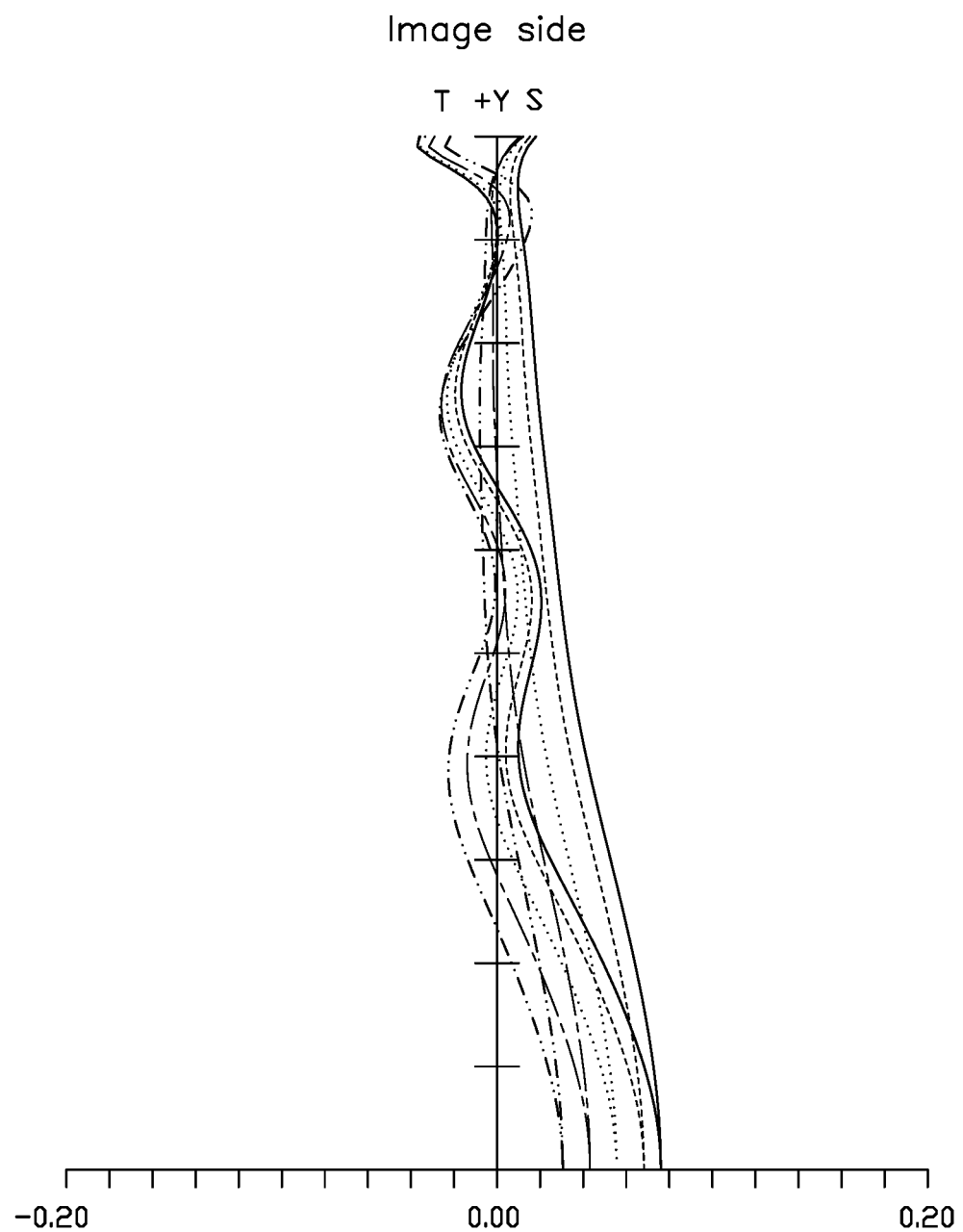
FIG. 5 is a characteristic curve diagram of visible light imaging field curvatures of a second embodiment of a lens.
Figure 6:
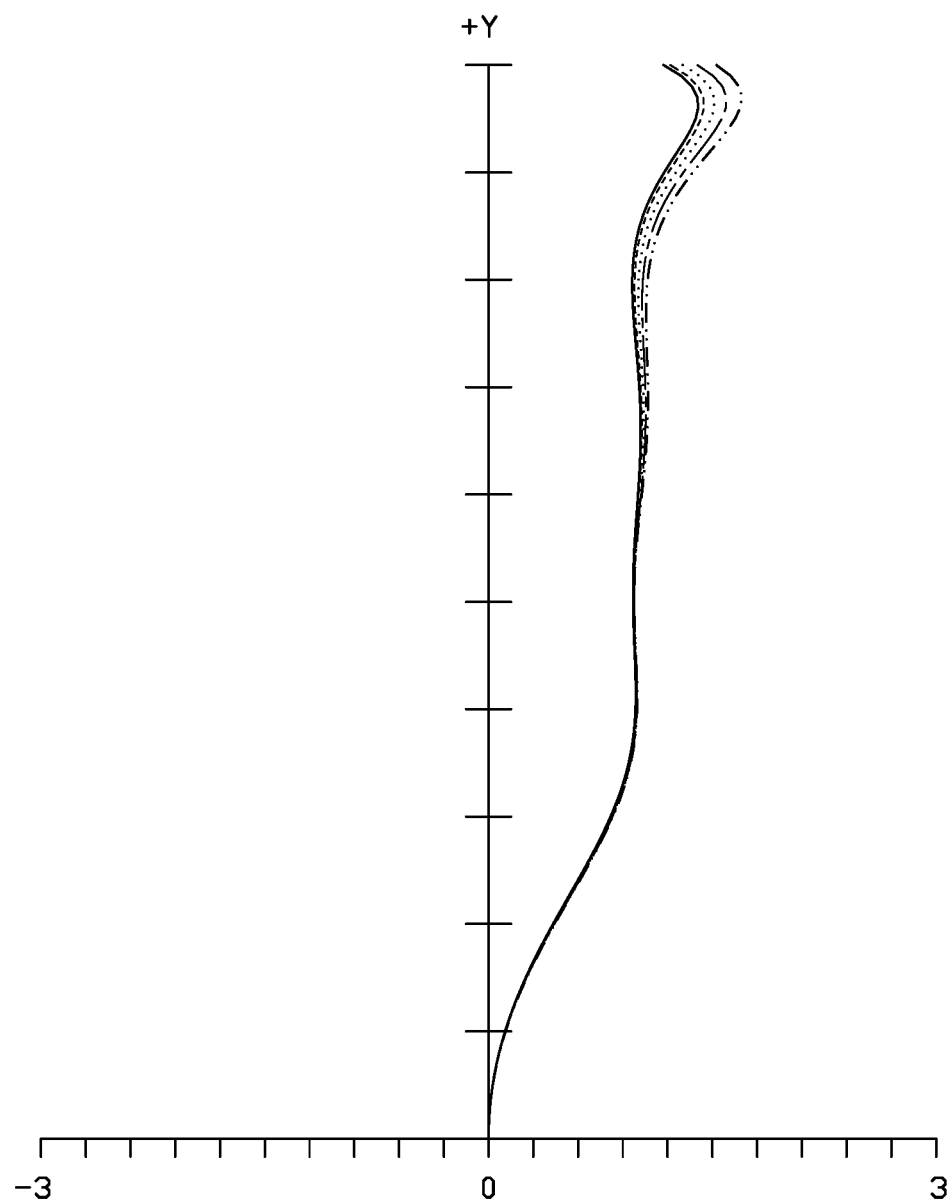
FIG. 6 is a visible light distortion characteristic curvature diagram of the second embodiment of the lens in FIG. 5.
Figure 7:
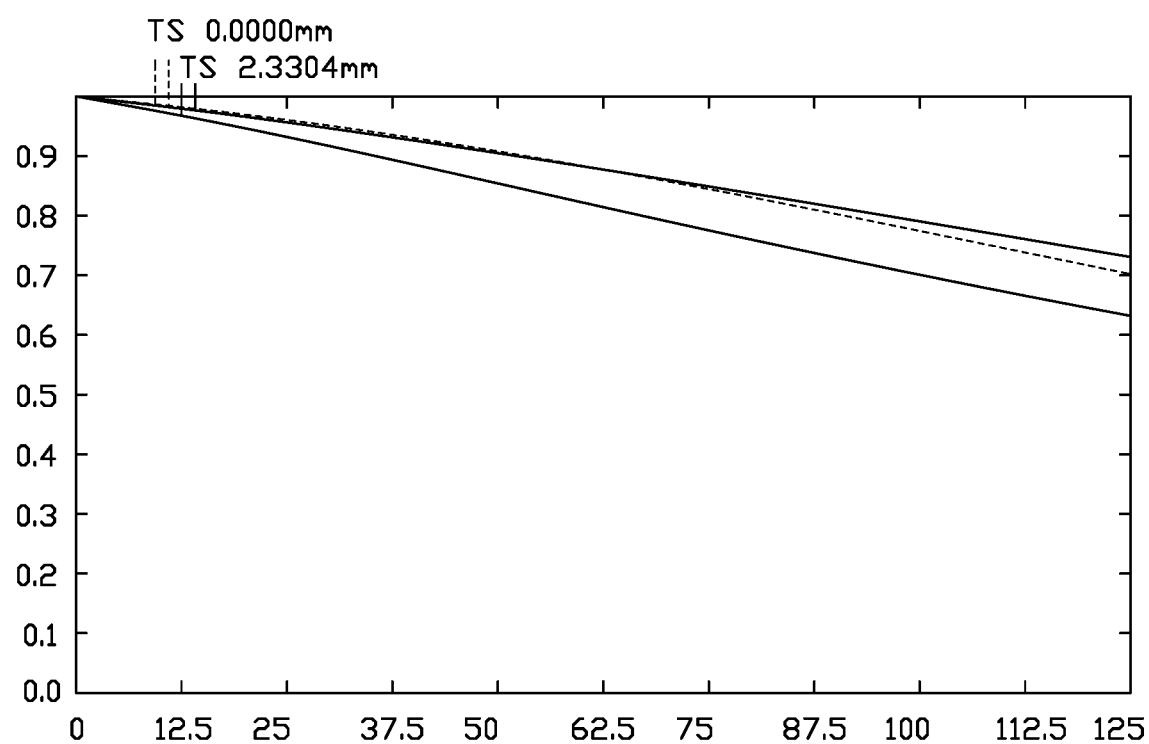
FIG. 7 is an MTF curvature diagram of the second embodiment of the lens.

FIG. 2 to FIG. 4 show a characteristic curve diagram of visible light imaging field curvatures of the lens as disclosed. A visible light distortion characteristic curvature diagram of the lens and an MTF (Modulation Transfer Function) curvature diagram of the lens in the first embodiment are also shown in those figures. FIG. 5 to FIG. 7 show a characteristic curve diagram of visible light imaging field curvatures of the lens in a second embodiment, a visible light distortion characteristic curvature diagram, and an MTF curvature diagram. The FIG. 2 to FIG. 7 illustrate that the field curvature can be controlled within a range of −0.20~+0.2 mm, and the distortion can be controlled within a range of 0~3%. Twenty-five percent of the Nyquist frequency of the two embodiments of the lens disclosed is 125 lp/mm. Under the ¼ frequency condition, the MTF of the center field view of the optical lens 100 is higher than 70%, and the MTF of eighty percent of the corner field view is higher than 60%.

Figure 8:
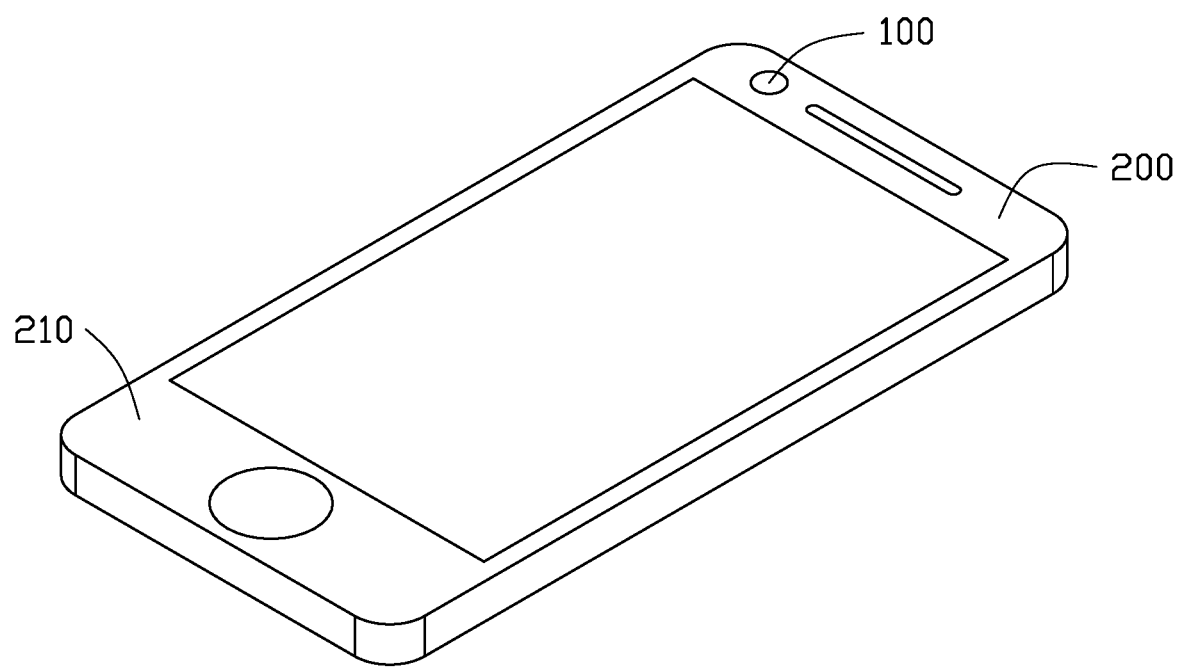
FIG. 8 is a schematic structural diagram of an electronic device employing the lens.

Referring to FIG. 8, an electronic device 200 is also disclosed. The electronic device 200 includes a body 210. The electronic device 200 further includes at least one optical lens 100 positioned in the body 210.

The optical lens 100 and electronic device 100 disclosed adopt a molded glass lens to make the first lens 10, and the first lens 10 to the sixth lens 60 meet all the conditions of the above formulas. Aberrations are corrected, so that the optical lens 100 has a good imaging quality.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure, up to and including the full extent established by the broad general meaning of the terms used in the claims.

What is claimed is:
1. A optical lens comprising:
   a first lens;
   a second lens;
   a third lens;
   a fourth lens;
   a fifth lens;
   a sixth lens;
   wherein the optical lens defines an optical axis, the first lens, the second lens, the third lens, the fourth lens, the fifth lens, the sixth lens are arranged in said order from the object side to the image side along the optical axis, the optical lens meets the conditional formulas as follows:

$4.55 < |EFL2|/|EFL1| < 4.95;$ $1.91 < (N1-N3)/(N2-N3) < 1.93;$ $0.16 < (V1-V3)/(V2-V3) < 0.20;$ $0.95 < (N4-N6)/(N5-N6) < 1.05;$ $0.95 < (V4-V6)/(V5-V6) < 1.05;$ wherein EFL1 is a focal length of the first lens group composed of the first lens to the third lens, EFL2 is a focal length of the second lens group composed of the fourth lens to the sixth lens, N1 is a refractive index of the first lens, N2 is a refractive index of the second lens, N3 is a refractive index of the third lens, N4 is a refractive index of the fourth lens, N5 is a refractive index of the fifth lens, N6 is a refractive index of the sixth lens, V1 is an Abbe number of the first lens, V2 is an Abbe number of the second lens, V3 is an Abbe number of the third lens, V4 is an Abbe number of the fourth lens, V5 is an Abbe number of the fifth lens, V6 is an Abbe number of the sixth lens;
   the first lens comprises a first surface adjacent to the object side and a second surface adjacent to the image side; the second lens comprises a third surface adjacent to the object side and a fourth surface adjacent to the image side; the third lens comprises a fifth surface adjacent to the object side and a sixth surface adjacent to the image side; the fourth lens comprises a seventh surface adjacent to the object side and an eighth surface adjacent to the image side; the fifth lens comprises a ninth surface adjacent to the object side and a tenth surface adjacent to the image side; the sixth lens comprises an eleventh surface adjacent to the object side and a twelfth surface adjacent to the image side; the first surface, the second surface, the third surface, the fourth surface, the fifth surface, the sixth surface, the eighth surface, the ninth surface, the eleventh surface are convex curved surfaces protruding toward the object side; the seventh surface and the tenth surface are convex curved surfaces protruding toward the image side, the two ends of the twelfth surface are convex curved surfaces protruding toward the image side, and the intermediate parts located on both sides of the optical axis are convex curved surfaces protruding toward the object side.

2. The optical lens of claim 1, wherein the optical lens further meets the conditional formula "1.10<D/TTL<1.30", wherein D is a maximum imaging circle diameter, and TTL is a total length of the optical lens.

3. The optical lens of claim 1, wherein the optical lens further meets the conditional formula 2.26<SF1<2.31 and 0.45<SF4<0.49; wherein $SFi=(C1i+C2i)/(C1i-C2i)$, i=1, 4, and C1i is a surface curvature of an i-th lens on the object side, C2i is a surface curvature of an i-th lens on the image side.

4. The optical lens of claim 1, wherein the optical lens further meets the conditional formula "0.95<T45/ET45<1.05" and "1.05<T56/ET56<1.65", wherein T45 is a thickness of a center interval between the fourth lens and the fifth lens, ET45 is an edge interval thickness between the fourth lens and the fifth lens, T56 is a center separation thickness between the fifth lens and the sixth lens, ET56 is an edge interval thickness between the fifth lens and the sixth lens.

5. The optical lens of claim 1, wherein each of the first surface, the second surface, the third surface, the fourth surface, the fifth surface, the sixth surface, the seventh surface, the eighth surface, the ninth surface, the tenth surface, the eleventh surface and the twelfth surface is aspherical.

6. The optical lens of claim 1, wherein a material of each of the second lens, the third lens, the fourth lens, the fifth lens and the sixth lens is plastic.

7. The optical lens of claim 1, wherein the optical lens further comprises a filter located a side of the sixth lens away from the fifth lens and an image plane located a side of the filter away from sixth lens; the sixth lens, the filter and the image plane are arranged at intervals.

8. The optical lens of claim 1, wherein the optical lens further comprises a diaphragm, the diaphragm is located between the second lens and the third lens.

9. An electronic device comprising:
a body;
an optical lens positioned in the body and comprising a f first lens, a second lens, a third lens, a fourth lens, a fifth lens, a sixth lens;
wherein the optical lens has an optical axis, the first lens, the second lens, the third lens, the fourth lens, the fifth lens, the sixth lens are arranged in order from the object side to the image side along the optical axis, the optical lens meets the conditional formulas:

$4.55<|EFL2|/|EFL1|<4.95$;

$1.91<(N1-N3)/(N2-N3)<1.93$;

$0.16<(V1-V3)/(V2-V3)<0.20$;

$0.95<(N4-N6)/(N5-N6)<1.05$;

$0.95<(V4-V6)/(V5-V6)<1.05$;

wherein EFL1 is a focal length of the first lens group composed of the first lens to the third lens, EFL2 is a focal length of the second lens group composed of the fourth lens to the sixth lens, N1 is a refractive index of the first lens, N2 is a refractive index of the second lens, N3 is a refractive index of the third lens, N4 is a refractive index of the fourth lens, N5 is a refractive index of the fifth lens, N6 is a refractive index of the sixth lens, V1 is an Abbe number of the first lens, V2 is an Abbe number of the second lens, V3 is an Abbe number of the third lens, V4 is an Abbe number of the fourth lens, V5 is an Abbe number of the fifth lens, V6 is an Abbe number of the sixth lens;
the first lens comprises a first surface adjacent to the object side and a second surface adjacent to the image side; the second lens comprises a third surface adjacent to the object side and a fourth surface adjacent to the image side; the third lens comprises a fifth surface adjacent to the object side and a sixth surface adjacent to the image side; the fourth lens comprises a seventh surface adjacent to the object side and an eighth surface adjacent to the image side; the fifth lens comprises a ninth surface adjacent to the object side and a tenth surface adjacent to the image side; the sixth lens comprises an eleventh surface adjacent to the object side and a twelfth surface adjacent to the image side; the first surface, the second surface, the third surface, the fourth surface, the fifth surface, the sixth surface, the eighth surface, the ninth surface, the eleventh surface are convex curved surfaces protruding toward the object side; the seventh surface and the tenth surface are convex curved surfaces protruding toward the image side, the two ends of the twelfth surface are convex curved surfaces protruding toward the image side, and the intermediate parts located on both sides of the optical axis are convex curved surfaces protruding toward the object side.

10. The electronic device of claim 9, wherein the optical lens further meets the conditional formula "1.10<D/TTL<1.30", wherein D is a maximum imaging circle diameter, and TTL is a total length of the optical lens.

11. The electronic device of claim 9, wherein the optical lens further meets the conditional formula 2.26<SF1<2.31 and 0.45<SF4<0.49; wherein $SFi=(C1i+C2i)/(C1i-C2i)$, i=1, 4, and C1i is a surface curvature of an i-th lens on the object side, C2i is a surface curvature of an i-th lens on the image side.

12. The electronic device of claim 9, wherein the optical lens further meets the conditional formula "0.95<T45/ET45<1.05" and "1.05<T56/ET56<1.65", wherein T45 is a thickness of a center interval between the fourth lens and the fifth lens, ET45 is an edge interval thickness between the fourth lens and the fifth lens, T56 is a center separation thickness between the fifth lens and the sixth lens, ET56 is an edge interval thickness between the fifth lens and the sixth lens.

13. The electronic device of claim 9, wherein each of the first surface, the second surface, the third surface, the fourth surface, the fifth surface, the sixth surface, the seventh surface, the eighth surface, the ninth surface, the tenth surface, the eleventh surface and the twelfth surface is aspherical.

14. The electronic device of claim 9, wherein a material of each of the second lens, the third lens, the fourth lens, the fifth lens and the sixth lens is plastic.

15. The electronic device of claim 9, wherein the optical lens further comprises a filter located a side of the sixth lens away from the fifth lens and an image plane located a side of the filter away from sixth lens; the sixth lens, the filter and the image plane are arranged at intervals.

16. The electronic device of claim 9, wherein the optical lens further comprises a diaphragm, the diaphragm is located between the second lens and the third lens.

\* \* \* \* \*